(12) United States Patent
Froelich et al.

(10) Patent No.: US 11,157,350 B2
(45) Date of Patent: Oct. 26, 2021

(54) IN-BAND MARGIN PROBING ON AN OPERATIONAL INTERCONNECT

(71) Applicant: Intel Corporation, Santa Clara, CA (US)

(72) Inventors: Daniel S. Froelich, Portland, OR (US); Debendra Das Sharma, Saratoga, CA (US); Fulvio Spagna, San Jose, CA (US); Per E. Fornberg, Portland, OR (US); David Edward Bradley, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/929,946

(22) Filed: May 29, 2020

(65) Prior Publication Data

US 2020/0364108 A1 Nov. 19, 2020

Related U.S. Application Data

(63) Continuation of application No. 15/761,405, filed as application No. PCT/US2015/052525 on Sep. 26, 2015, now Pat. No. 10,671,476.

(51) Int. Cl.
| | |
|---|---|
| *G06F 11/08* | (2006.01) |
| *G06F 13/14* | (2006.01) |
| *G06F 11/10* | (2006.01) |
| *G06F 11/22* | (2006.01) |
| *H04L 1/00* | (2006.01) |

(52) U.S. Cl.
CPC .......... *G06F 11/08* (2013.01); *G06F 11/1004* (2013.01); *G06F 11/221* (2013.01); *G06F 13/14* (2013.01); *H04L 1/0061* (2013.01)

(58) Field of Classification Search
CPC .... G06F 11/08; G06F 11/1004; G06F 11/221; H04L 1/0061
See application file for complete search history.

(56) References Cited

U.S. PATENT DOCUMENTS

| | | | |
|---|---|---|---|
| 2012/0089750 A1* | 4/2012 | Ajanovic | .............. G06F 1/3203 710/5 |
| 2013/0051483 A1 | 2/2013 | Wyatt et al. | |

(Continued)

FOREIGN PATENT DOCUMENTS

EP 2779551 A2 9/2014

OTHER PUBLICATIONS

International Preliminary Report on Patentability for PCT Patent Application No. PCT/US2015/052525 dated Apr. 5, 2018; 13 pages.

(Continued)

*Primary Examiner* — Shelly A Chase
(74) *Attorney, Agent, or Firm* — Alliance IP, LLC

(57) ABSTRACT

There is disclosed in an example an interconnect apparatus having: a root circuit; and a downstream circuit comprising at least one receiver; wherein the root circuit is operable to provide a margin test directive to the downstream circuit during a normal operating state; and the downstream circuit is operable to perform a margin test and provide a result report of the margin test to the root circuit. This may be performed in-band, for example in the L0 state. There is also disclosed a system comprising such an interconnect, and a method of performing margin testing.

28 Claims, 9 Drawing Sheets

(56) References Cited

U.S. PATENT DOCUMENTS

| | | |
|---|---|---|
| 2014/0006675 A1 | 1/2014 | Meir |
| 2014/0112339 A1 | 4/2014 | Safranek et al. |
| 2014/0215437 A1* | 7/2014 | Iyer .......................... G06F 8/77 |
| | | 717/123 |
| 2014/0237302 A1 | 8/2014 | Berry, Jr. et al. |
| 2014/0281067 A1 | 9/2014 | Sharma et al. |

OTHER PUBLICATIONS

International Search Report and Written Opinion for PCT Patent Application No. PCT/US2015/052525 dated Jul. 26, 2016; 14 pages.

* cited by examiner

IN-BAND MARGIN PROBING ON AN OPERATIONAL INTERCONNECT

CROSS-REFERENCE TO RELATED APPLICATIONS

This application is a continuation (and claims the benefit of priority under 35 U.S.C. § 120) of U.S. patent application Ser. No. 15/761,405, filed on Mar. 19, 2018, entitled IN-BAND MARGIN PROBING ON AN OPERATIONAL INTERCONNECT, which is a national stage application under 35 U.S.C. § 371 of PCT International Application Serial No. PCT/US2015/052525, filed on Sep. 26, 2015, and entitled IN-BAND MARGIN PROBING ON AN OPERATIONAL INTERCONNECT. The disclosure of the prior applications are considered part of and are hereby incorporated by reference in their entirety in the disclosure of this application.

FIELD

This disclosure pertains to computing system, and in particular (but not exclusively) to a system and method for in-band margin probing on an operational interconnect.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates increases, corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
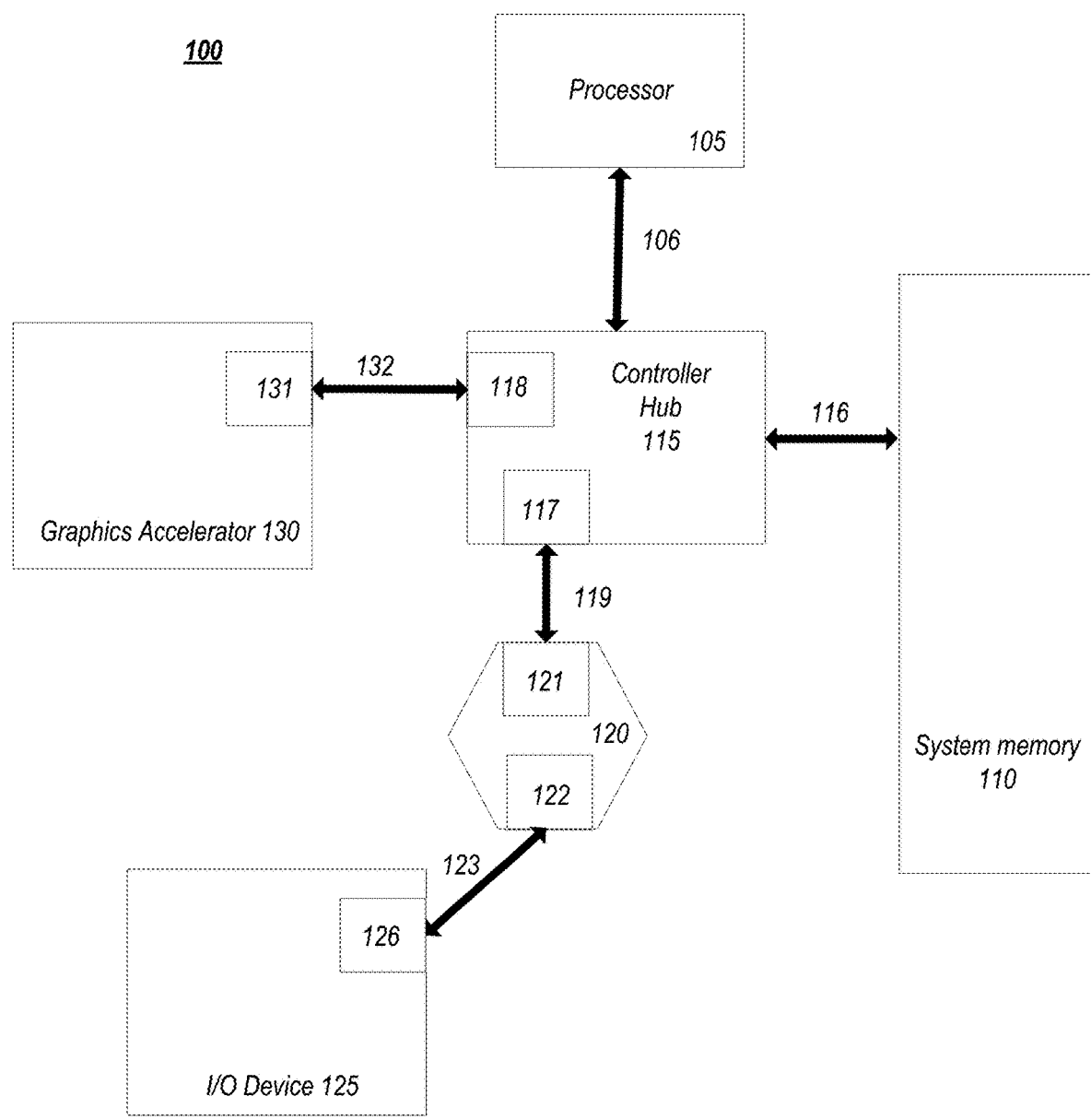
FIG. 1 illustrates an embodiment of a computing system including an interconnect architecture.

By way of summary, there is disclosed in an example an interconnect apparatus having: a root circuit; and a downstream circuit comprising at least one receiver; wherein the root circuit is operable to provide a margin test directive to the downstream circuit during a normal operating state; and the downstream circuit is operable to perform a margin test and provide a result report of the margin test to the root circuit. This may be performed in-band, for example in the L0 state. There is also disclosed a system comprising such an interconnect, and a method of performing margin testing.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to servers, workstations, desktop computer systems, Ultrabooks™, networking systems, or storage systems. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), hand-held, and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
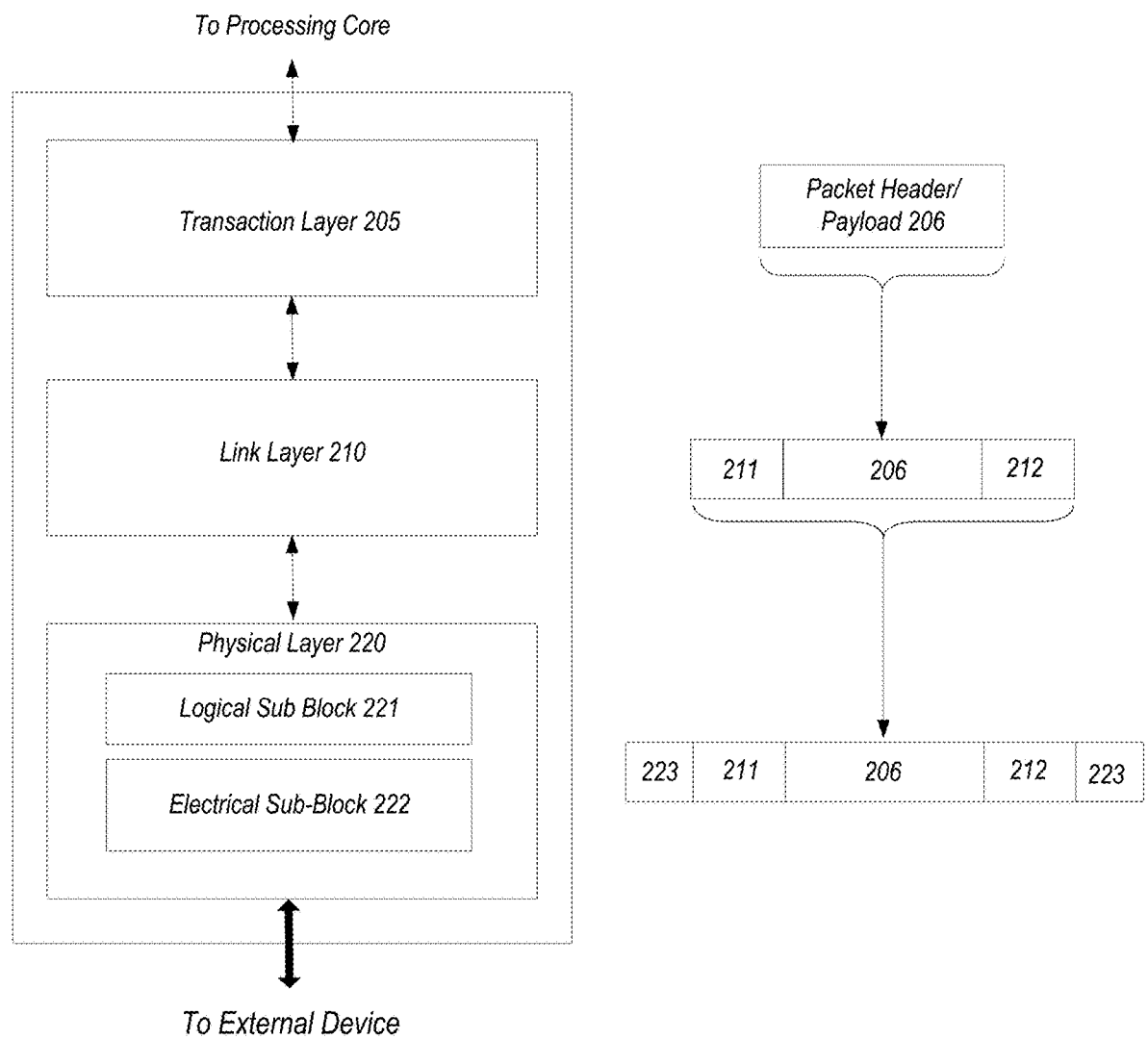
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
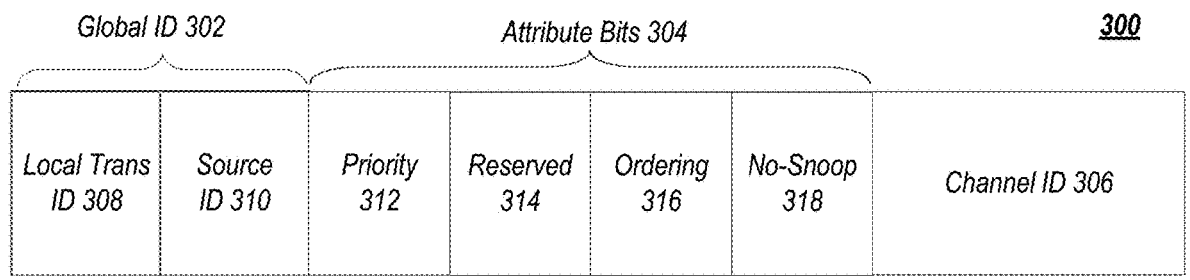
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is deserialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
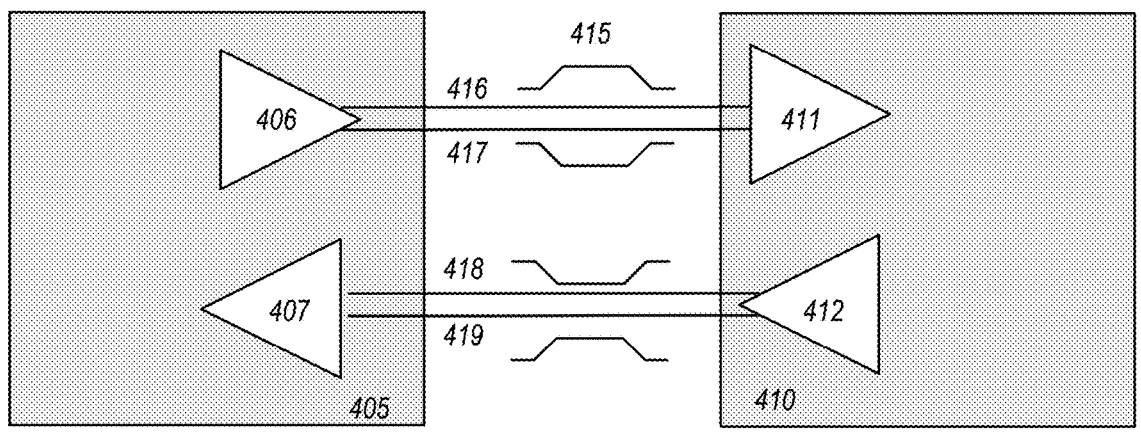
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

High Speed Channel

A revision to the PCIe I/O specification is PCIe revision 4.0 (or PCIe 4.0). At a 16 GT/s bit rate, PCIe 4.0 aims to double the interconnect performance bandwidth over the PCIe 3.0 specification, while preserving compatibility with software and mechanical interfaces. Increasing the performance bandwidth over prior generations of PCIe can provide performance scaling consistent with increasing bandwidth demand from a variety of developing applications while also aiming to provide low cost, low power and minimal perturbations at the platform level. One of the main factors in the wide adoption of the PCIe architecture is its sensitivity to high-volume manufacturing capabilities and materials such as lower cost circuit boards, low-cost connectors, and so on.

The 16 GT/s bit rate aims to provide an optimum tradeoff between performance, manufacturability, cost, power and compatibility. Feasibility analyses have been performed to recommend characteristics for devices and channels that support the 16 GT/s bit rate for PCIe 4.0. PCI-SIG analysis covered multiple topologies. For instance, analyses have determined that 16 GT/s on copper, which will double the bandwidth over the PCIe 3.0 specification, is technically feasible at approximately PCIe 3.0 power levels. Here, a 16 GT/s interconnect is potentially manufactured in mainstream silicon process technology and deployed with existing low-cost materials and infrastructure, while maintaining compatibility with previous generations of PCIe architecture.

Figure 5:
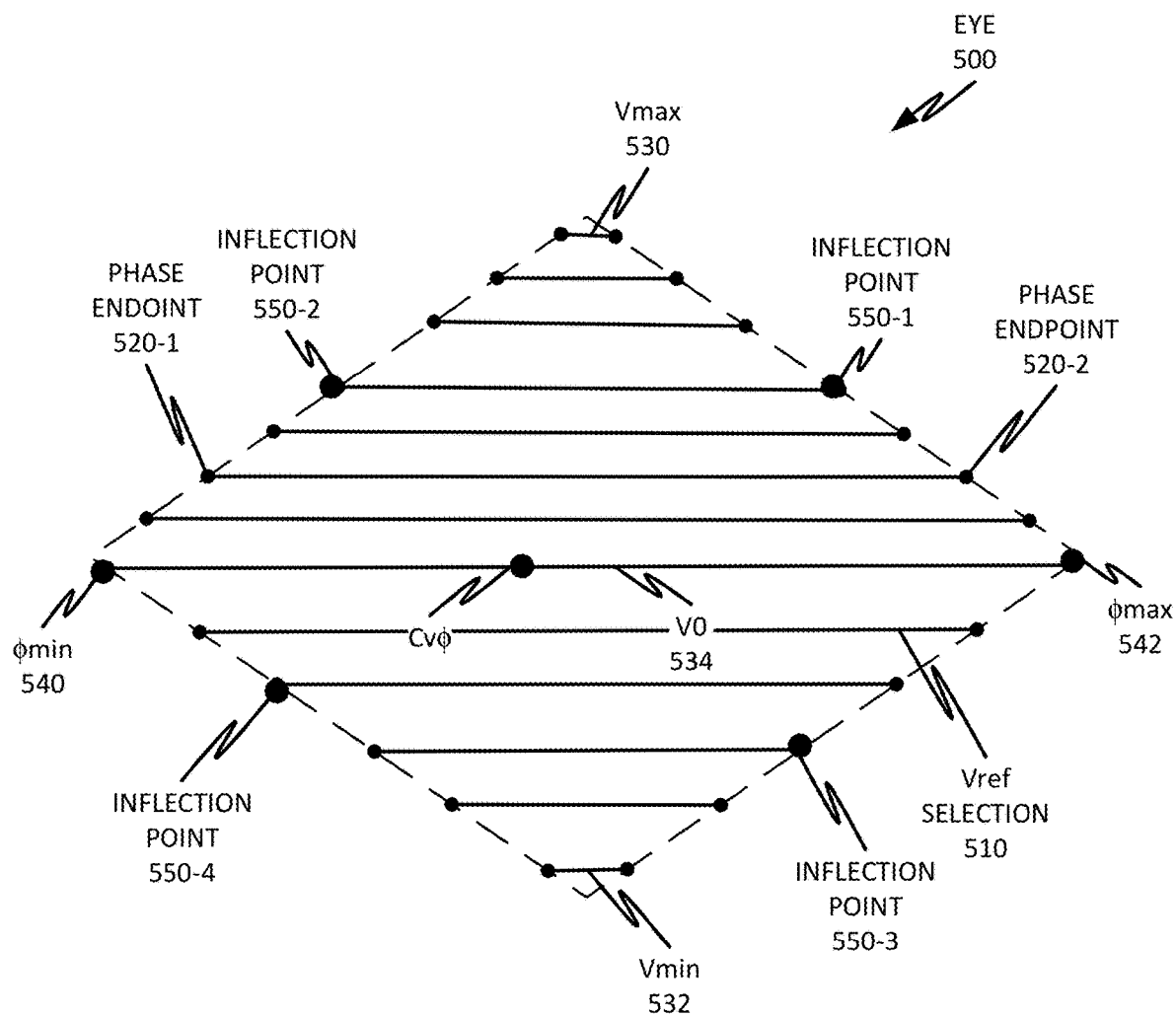
FIG. 5 illustrates an embodiment of selecting margins, including an "eye" for an interconnect architecture.

FIG. 5 illustrates an embodiment of centering according to one or more examples of the present specification. In this embodiment, when the interface is brought up from a powered-down state, the link must be "trained" before it can function at full speed. Training is necessary because values may "drift" over time and between varying conditions, such as temperature. Particularly with a high-speed link like PCIe, it is necessary to have signals properly centered in both the time domain (horizontally) and the voltage domain (vertically) to avoid bit errors that may be introduced by parameter drift.

Training may include "centering" or "recentering" the clock signal to ensure that signals are properly centered in both the time domain and voltage domain. At any given speed, the clock has a window in which a sample of a data lane will yield a correct value. Sampling outside the window may yield a bit error. The faster the clock, the smaller the window. Adding complication, there are separate windows for vertical $V_{ref}$ centering and horizontal phase centering. Thus, an important aspect of training in one example, and especially in a high-speed interconnect with a narrow window, is adjusting both the $V_{ref}$ and phase of the clock so that data are sampled at or near the center of the window to minimize bit errors.

In one example, training includes feeding the interface a known value such as a pseudo-random bit sequence (PRBS), and then sampling back the bit pattern. After a sample, the clock may be shifted vertically in the voltage domain ($V_{ref}$), or horizontally in the time domain (phase). The interface detects when bit errors begin to occur, thus constructing a two-dimensional "eye," which may be of a substantially rhomboid shape. In simple terms, values within the eye result in no (or acceptably few) bit errors, while values outside the eye result in an unacceptable number of bit errors.

Centering may include a combination of both hardware and software. Software centering may run, in certain embodiments, from a basic input-output system (BIOS) chip. In one example, hardware is provided for basic or initial centering operations, which may provide a rough centering solution. Software may then be used to supplement and refine the initial centering. Software centering provides additional flexibility, and in some cases provides greater programmability of logic as compared to hardware centering. This can address issues such as, for example, hardware centering finding what it believes is a "near center" for the eye, when in fact an even nearer center is available via additional passes.

In one example, the hardware includes 32 quantized delay settings for phase adjustment, though any number may be provided. $V_{ref}$ settings may be similarly quantized.

In a first (hardware-only) stage, centering may comprise a sweep of the quantized phase settings across each lane, conducted at a nominal voltage V, such as an original value, or the last computed value. After each sweep, an error detector enumerates the number of errors encountered in each pass, if any.

Error detection in this embodiment is an example of transmitter (Tx) adaptation, i.e., Tx values are adjusted based on remote receiver (Rx) metrics which are made available to Tx on a backchannel. Software typically running on a core on the upstream die can access the local die and remote die using a sideband, which serves as the backchannel. Such adaptation may happen in both directions simultaneously since the backchannel is not on the same wire as the link layer.

In an embodiment, each sweep is aggregated. Thus, the sweep is scored not on the number of errors on any one lane, but on the number of errors across all lanes. This means that in some cases, a setting that is the best for an individual lane may not be the best for the interconnect as a whole. This phase sweep may be performed in hardware at initial bootup, and may be used to perform a rough centering, in which an approximate center phase $\phi_0$ is selected. In an embodiment, the phase sweep is performed at full speed so that the value of $\phi_0$ is suitable for full-speed operation. In other embodiments, the initial hardware sweep may first be performed at partial speed, such as at half speed, and refined later at full speed.

In another embodiment, each lane is treated independently rather than selecting a converged value across multiple lanes. As before, this sweep may be performed at speed, and may be performed strictly in hardware. The Tx-Rx setting combination used in certain embodiments of this specification is performed initially, and may employ indirect measures rather than measuring error count. The methods of this specification may then be applied later, as necessary.

After the phase sweep is complete, the interface is brought to full speed (if necessary), and software instructions may be loaded from BIOS to continue refining centering in software. In this second stage (performed in one example in software) the voltage ($V_{ref}$) value is similarly swept across quantized settings. Each sweep may be performed at a voltage of $\phi_0 \pm \sigma$. Stated differently, each lane performs a $V_{ref}$ sweep with the phase set at $\phi_0$ to determine the optimal $V_{ref}$ value at that phase. Offset $\sigma$ is then incremented, for example by 1, and $V_{ref}$ is swept on either side of $\phi_0$ (e.g., $\phi_0 \pm \sigma$). If the eye is not yet fully defined, a may again be incremented, and the process may be repeated until the eye is fully defined (see FIG. 5), which occurs in one embodiment when $V_{max} \approx V_{min}$ (where $V_{max}$, is the maximum voltage with an acceptable error rate at the selected $\phi$ and $V_{min}$ is the minimum voltage with an acceptable error rate at the selected $\phi$).

As with the phase sweep, each voltage sweep results in zero or more errors, and the result at each $V_{ref}$ value is aggregated across all lanes. In an embodiment, the $V_{ref}$ sweep is performed at operational speed (8 GHz or 16 GHz in one example) to ensure that the results are valid for operational speeds.

In a third stage, software may construct a two-dimensional "eye," including a center point, based on the values identified in the first two stages. The eye may be a rhomboid or other suitable shape. Determining an optimal center for the eye may be non-trivial, since the eye opening may be asymmetric, non-monotonic around the major inflection points, and somewhat time-variant. Thus, eye centering may be performed in software. In one example, centering includes finding the values of $\phi_{max}$ and $\phi_{min}$, and a midpoint between the two, as well as Vmax and Vmin, and a midpoint between the two. From the midpoints, the software can compute a proposed center $C_{V\phi}$.

The software may then select four inflection points along the edges of the rhomboid, and run a test pattern at the inflection points, along with the four apexes of the rhomboid, located at $V_{max}$, $V_{min}$, $\phi_{max}$, and $\phi_{min}$. If the eye has been constructed and centered properly, these eight points should all fall just within the eye, and should thus have an acceptable error rate. If any of the eight points results in an unacceptable error rate, the eye may need to be adjusted to improve performance. For example, if an inflection point fails, the boundary of the eye may need to be adjusted one quantum inward on one or both axes. The new value then needs to be similarly tested to ensure that it passes. When a point is thus adjusted, the center $C_{V\phi}$ may also be adjusted accordingly.

FIG. 5 is an illustration of an example of an eye 500. In this illustration, eye 500 is a proper rhombus for ease of illustration. However, the features of eye 500 need not be, and often will not be, regular or monotonic. The rhomboid defined by eye 500 could be skewed left, right, up, or down, and the edges need not consist of perfectly collinear lines. This may especially be true once eye 500 has been subjected to centering.

In this example, eye 500 is defined initially by sweeping each $V_{ref}$ selection 510 across a plurality of phase quanta to identify two phase endpoints 520 for that $V_{ref}$ selection. The sweeps may begin with $V_0$ 534, and proceed in quantized steps above and below until $V_{max}$ 55 and $V_{min}$ 532 are identified. In this example, $\phi_{max}$ 542 and $\phi_{min}$ 540 both occur on the $V_0$ line, though in reality one or both may occur on some other line, and need not occur on the same line.

Inflection points 550 are also chosen. In this example, $V_0$ to $V_{max}$ comprises an odd number of quanta, so that inflection points 550-1 and 550-2 can be chosen at the "true" center point between the two. However, $V_0$ to $V_{min}$ comprises an even number of quanta, so that inflection points 550-3 and 550-4 must be chosen off center. These may be chosen by a floor function, a ceiling function, or one may be chosen on either side of the divide, depending on design choices.

An initial center $C_{V\phi}$ is also chosen. Again, because the values are quantized, this may not be the geometric center, but rather may be off center by one or more quanta in any direction. During centering, $V_{max}$ 55, $V_{min}$ 532, $\phi_{max}$ 542, $\phi_{min}$ 540, and inflection points 550 are used as test points. As a result of testing, any of these points may be adjusted up or down, left or right, by one or more quanta, thus making the shape of eye 500 more irregular. As test points are adjusted, center $C_{V\phi}$ may also be adjusted accordingly as necessary. Once centering is complete, all lanes are set to the phase and voltage values of $C_{V\phi}$ to ensure optimal operation.

In certain aspects of the present disclosure, methods are disclosed for constructing an eye 500 in an active PCIe link operating in the L0 active state without the need for any external electrical test equipment. Similar methods of obtaining receiver margin information from active links may also be applied to other high speed I/O standards.

The methods disclosed herein provide many advantages. For example, performing standard receiver tests and electrical debug on PCIe and other high speed I/O devices is often costly in both time and equipment costs. An electrical Bit Error Rate Test system (BERT) is required in some embodiments. BERTs have high equipment costs and may require significant experience and knowledge to operate correctly. Some existing devices support in-silicon eye margining, but the control methods and implementations are proprietary and it may be difficult to test a third parties' products without specific legal agreements and support from the third party. Furthermore, at 16 GT/s many PCIe links require active extension devices, such as "retimers," in between the root port and endpoint in the link. Thus, it has been recognized that there is a need to identify and locate errors in retimers (e.g., which receiver of which retimer is experiencing the errors).

In one example, each device on a PCIe or other link, including retimers, implements the methods disclosed herein. This allows the device to "margin" its voltage and timing at the receivers while the link is in the active L0 state. Advantageously, this provides standardized control and reporting of Rx margin information for all receivers while the link is in the active L0 state, without requiring a separate state or test mode.

Figure 6:
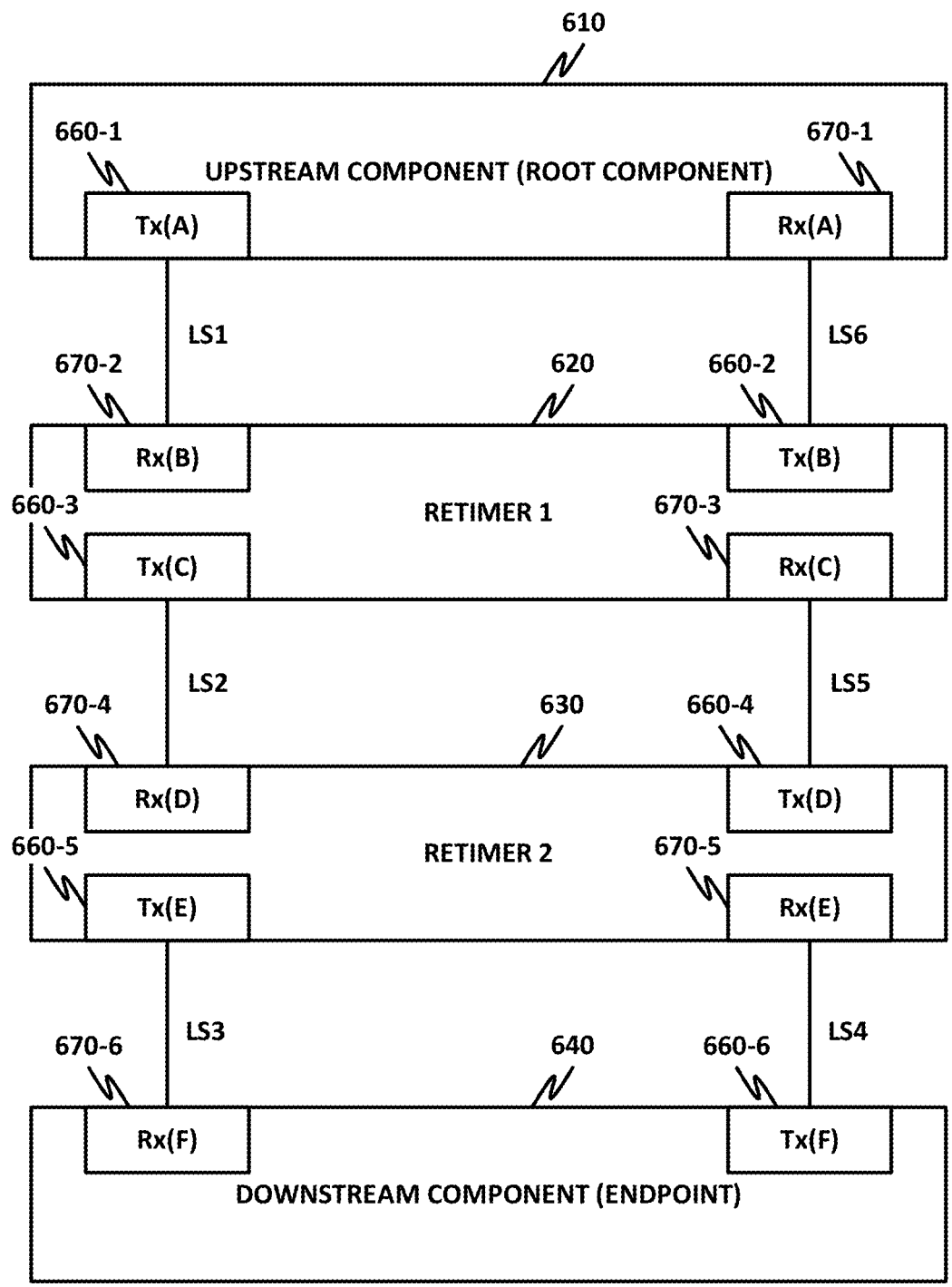
FIG. 6 illustrates a block diagram embodiment of an interconnect architecture, including multiple retimers.

FIG. 6 illustrates an embodiment of an interconnect user using retimers. Specifically, a root circuit 610 is communicatively coupled to an endpoint 640 via an interconnect as PCIe. Because the interconnect is operating at high speed, it may be necessary to interpose retimers, such as retimer 1 620 and retimer 2 630 between root circuit 610 and endpoint 640. Root circuit 610 should be understood to include any component, circuit, integrated circuit, package, or chip that performs root functions on the interconnect. In the case of a PCIe interconnect, root circuit 610 may include the PCIe root complex. In other embodiments, root circuit 610 may include any appropriate circuit providing upstream functionality.

For purposes of illustration, root circuit 610 is labeled as an "upstream component" according to PCIe terminology, and endpoint 640 is labeled as a "downstream circuit" according to PCIe terminology. However, more generally, root circuit 610 may be referred to as an upstream device, while retimer 1 620, retimer 2 630, and endpoint 640 may be referred to as downstream circuits. This is to illustrate that the methods disclosed herein can be used with any suitable interconnect, and the specific names used are not intended to be limiting.

In this example, root circuit 610 includes transmitter Tx(A) 660-1 and receiver Rx(A) 670-1. Tx(A) begins the downlink portion. Retimer 1 includes Rx(B) 670-2, which is communicatively coupled to Tx(A) 660-1, and is configured to relay data and signals to Tx(C) 660-3. Retimer 2 includes receiver Rx(D) 670-4 communicatively coupled to Tx(C) 660-3. Rx(D) 670-4 relays data and signals to Tx(E) 660-5. Endpoint 640 includes Rx(F) 670-6, which is communicatively coupled to Tx(E) 660-5, thus finishing the downlink.

On the uplink side, endpoint 640 includes Tx(F) 660-6. Retimer 2 630 includes Rx(E) 670-5, which is communicatively coupled to Tx(F) 660-6, and which relays data and signals to Tx(D) 660-4. Retimer 1 includes Rx(C) 670-3, which is communicatively coupled to Tx(D) 660-4, and which relays data and signals to Tx(B) 660-2. Finally, Tx(B) is communicatively coupled to Rx(A) 670-1, thus completing the uplink.

In this embodiment, the link between Tx(A) 660-1 and Rx(B) 670-2 is referred to as Link Segment 1 (LS1). The link between Tx(C) 660-3 and Rx(D) 670-4 is referred to as Link Segment 2 (LS2). The link between Tx(E) 660-5 and Rx(F) 670-6 is referred to as Link Segment 3 (LS3). The link between Tx(F) 660-6 and Rx(E) 670-5 is referred to as Link Segment 4 (LS4). The link between Tx(D) 660-4 and Rx(C) 670-3 is referred to as Link Segment 5 (LS5). The link between Tx(B) 660-2 and Rx(A) 670-1 is referred to as Link Segment 6 (LS6).

The present specification provides a standard method for controlling and reporting link margin information for PCIe devices (including retimers) while they are still operating in the active L0 link state. Specifically, PCIe provides encoded "filler" symbols, with widths such as 128 bits or 130 bits. These are also known as SKP ordered sets. SKP sets are used to allow clocks that are slightly out of sync with one another to remain synchronized. For example, if the clock of a retimer is slightly slower than the clock on root circuit 610, SKP sets may give the slower clock time to "catch up."

In this specification, it is recognized that SKP ordered sets may be used to enable or control Rx margining capability and to report results. It should be noted that the use of SKP sets is provided by way of nonlimiting example only, and that other methods of providing the symbols may be used. For example, a new ordered set could be defined, of an existing ordered set in a non-PCIe interconnect could be used.

Figure 7:
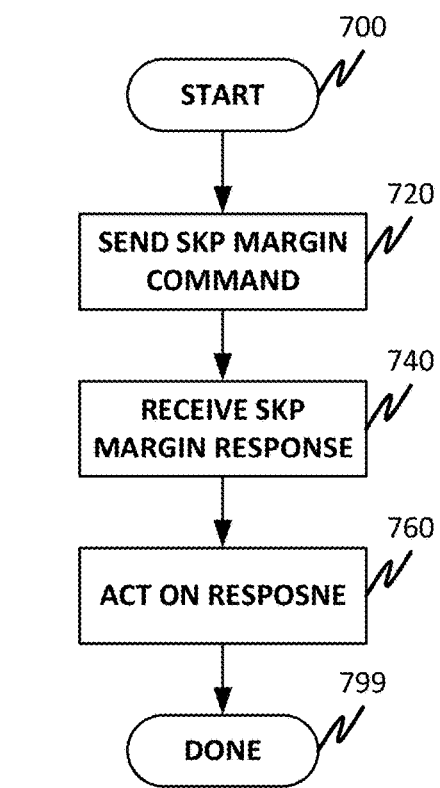
FIG. 7 is a flowchart illustrating an example of sending margin test directives in an interconnect architecture.

FIG. 7 is a flow chart of a method performed by root circuit 610 in an example of the present specification.

Starting in block 700, at block 720, root circuit 610 acting as an upstream devices sends a SKP margin command to one or more downstream circuits, such as retimers 620, 630 or endpoint 640. These commands may be generated through a set of configuration registers that system software can control.

At block 740, after waiting an appropriate time, root circuit 610 receives an SKP margin response from the downstream circuit.

In block 760, root circuit 610 acts on the response. For example, after collecting one or more responses, root circuit 610 may determine that the interconnect should be operated with different timing, or at a different voltage. In some cases, if many errors are encountered, root circuit 610 may determine that the interconnect needs to be operated at a reduced clock rate to mitigate errors. If the interconnect is already operating at a reduced clock speed because of previous errors, a reduction in errors may indicate that it is safe for the interconnect to return to full speed. In a general sense, in block 760, root circuit 610 may take any action appropriate to its function, and the action may be informed by responses from one or more downstream circuits. It should be noted that the responses may be captured in a set of status registers and the subsequent actions taken at the request of system software through a different set of control registers.

It should also be noted that in some cases, root circuit 610 may perform testing of its own receiver Rx(A) 670-1 while operating in the L0 state. In some embodiments, this may be accomplished without the need for sending any SKP packets across the link segments.

In block 799, the method is done.

Figure 8:
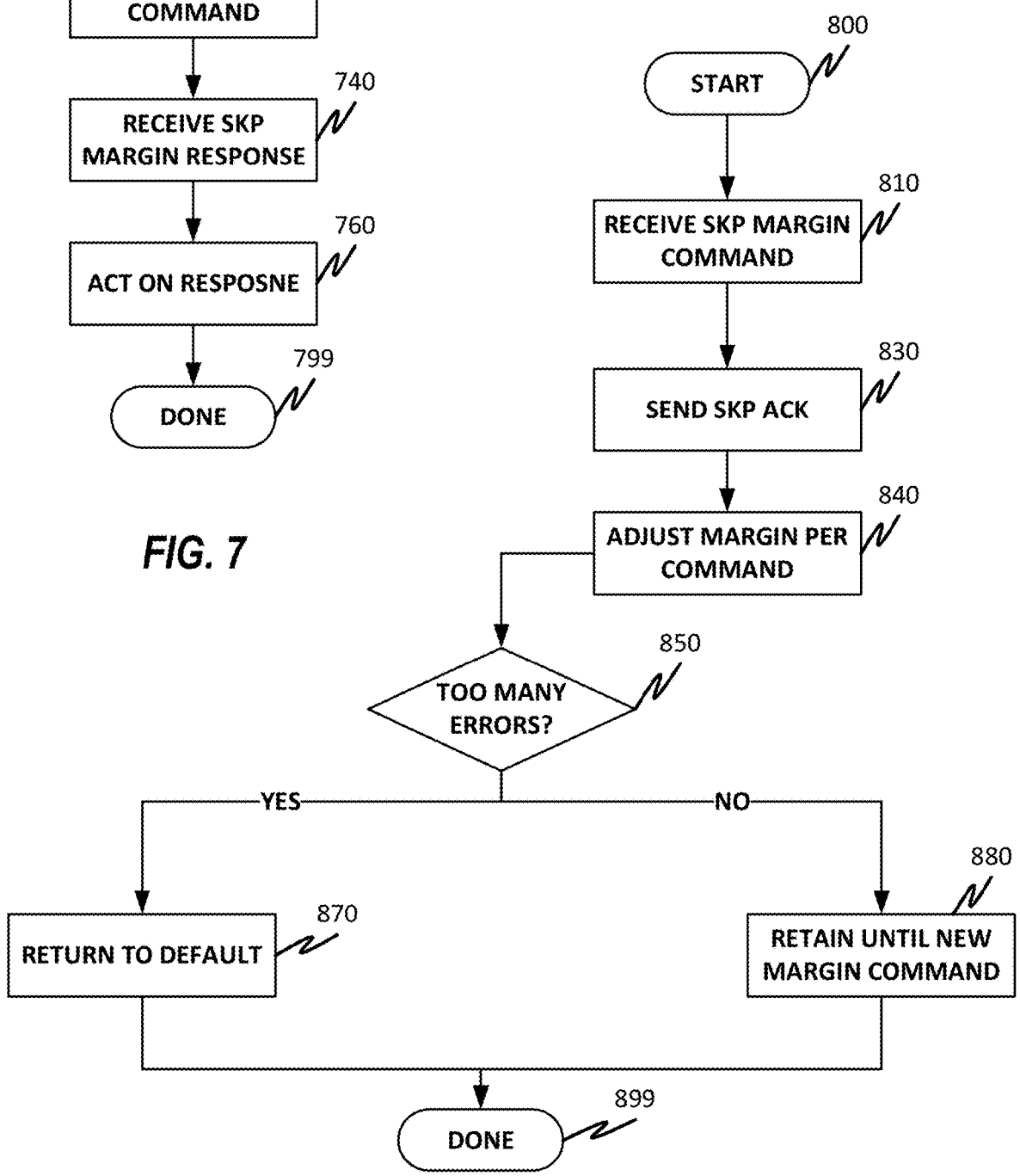
FIG. 8 is a flowchart illustrating an example of receiving and acting on margin test directives in an interconnect architecture.

Turning to FIG. 8, there is disclosed a method performed by a downstream circuit, such as retimers 620, 630 or endpoint 640.

Starting in block 800, a receiver 670 starts in the L0 operating condition with a designated default operating position, without any margining. The default in one example may be eye center $C_{V\phi}$, or any other suitable default operating point. Receiver 670 may be any receiver 670 on any retimer 620, 630, or on endpoint 640. In some cases, receiver 670 may be receiver Rx(A) 670-1 of root circuit 610.

At block 810, receiver 670 receives an SKP margining command (SKP CSR). Each downstream circuit may have configuration space registers that allow SKP CSRs to be issued with any possible link margin.

In block 830, receiver 670 provides an acknowledgement, such as in the next SKP_CSR moving upstream.

In block 840, either before or after sending ACK, receiver 670 adjusts its margin per the margining command. For example, receiver 670 may adjust its voltage one quantum step up or down, or adjust its clock by one quantum step up or down. In this example, a fixed step size for the timing margin may be 2 ps, while and a fixed step size for the voltage margin may be 5 mV. It should be noted, however, that alternate implementations are possible. For example, the voltage and timing step sizes may be implementation specific, and may be reported by receiver 670 along with its acknowledgement. The method of performing the timing and voltage margin change may be implementation specific. In one example, receiver 670 has a second sampler that it relocates in response to margin commands. In this example, data reported by receiver 670 comes from the second sampler whenever margin commands have moved the margining away from the default.

In decision block 850, receiver 670 checks whether it has received too many parity errors at the new setting. The error threshold is implementation specific, and may be selected to ensure proper operation of the interconnect.

In block 870, if there are too many errors, receiver 670 returns to its default setting, such as $C_{V\phi}$ or some other suitable value. Receiver 670 may also report this condition to root circuit 610, either in its ACK SKP packet (see block 830), or in a later SKP.

In block 880, if there have not been too many errors, then receiver 670 may retain its current margin position until instructed to move again. Alternatively, receiver 670 could return to its default setting after a pre-configured timeout, or a timeout could be provided in the SKP CSR packet.

In some embodiments, receiver 670 may also issue link margin commands on its own for implementation specific reasons.

In block 899, the method is done.

The table below illustrates an example of upstream and downstream packets that may be used for link margin commands. These are provided merely by way of nonlimiting example to illustrate one possible implementation of the present specification.

| Symbol | Downstream to Upstream | Upstream to Downstream |
|---|---|---|
| 4N | SKP_CSR (0x78) | SKP_CSR (0x78) |
| 4N + 1 | Bit 7: Parity | Bit 7: Parity |
| 4N + 1 | Bit [6:4]: Margin Command<br>000—No extra margining<br>001—Left 1 step<br>010—Right 1 step<br>110—Clear margin error logs<br>101—Voltage up 1 step<br>110—Voltage down 1 step<br>111—Return to default | Bit 6: ParityError Detected by DSC Rx<br>Bit 5: Too many errors in DSC Rx - reverted back to default<br>Bit 4: Ack of margin command by DSC |
| 4N + 1 | Bit [3:1]: Link Segment Number for margin command (0: Reserved; 1-6: LS number, 7 - all LSs) | Bits [3:1]: Inverse of Bits [6:4] (for error checking) |
| 4N + 1 | Bit 0: Even parity of bits [6:1] in this symbol | Bit 0: Even parity of bits [6:1] in this symbol. |
| 4N + 2 | Bit 7: Reserved | Bit 7: Reserved |
| 4N + 2 | Bits [6:1]: Inverse of bits [6:1] of symbol 4N + 1 | Bit 6: Parity error detected by retimer 2's LS2 Rx<br>Bit 5: Parity error detected by retimer 2's LS4 Rx<br>Bit 4: Too many errors in LS2 Rx; reverted to default<br>Bit 3: Too many errors in LS4 Rx; reverted to default<br>Bit 2: Ack of non-zero margin command by retimer 2<br>Bit 1: Reserved |
| 4N + 2 | Bit 0: Even parity of bits [6:1] of symbol 4N + 2 | Bit 0: Even parity of bits [6:1] for symbol 4N + 2 |
| 4N + 3 | Bits [7:0]: Fixed 8'b11001100 | Bit 7: Reserved<br>Bit 6: Parity error detected by retimer 1's LS1 Rx<br>Bit 5: Parity error detected by retimer 2's LS5 Rx<br>Bit 4: Too many errors in LS1 Rx; reverted to default<br>Bit 3: Too many errors in LS5 Rx; reverted to default<br>Bit 2: Ack of non-zero margin command by retimer 2<br>Bit 1: Reserved<br>Bit 0: Even parity of bits [6:1] for symbol 4N + 3 |

As illustrated here, SKP CSR may target a specific link segment (see FIG. 6). For example, a link margin command targeting LS1 targets receiver Rx(B) 670-2. In this illustrative example, the addressing is fixed based on a PCIe architecture only allowing up to two retimers in a link between root circuit 610 and endpoint 640. However, other architectures are possible, and in a general sense, additional retimers can be accommodated with additional bits or additional symbols.

In the above example, retimers may know whether to respond to commands for retimer 1 620 or retimer 2 630 based on in-band bits in training sets that indicate whether another retimer is present.

It should be noted that while much of the above principles and examples are described within the context of PCIe and particular revisions of the PCIe specification, the principles, solutions, and features described herein can be equally applicable to other protocols and systems.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

In an operational example, a first receiver 670-1 is instructed to shift its phase from $\phi_0$ ten steps to the right. First receiver 670-1 complies, and does not experience bit errors (or experiences an acceptable bit error rate), and so remains at the new phase setting. It continues to report its status until it is instructed to move to some other setting. A second receiver 670-2 is instructed to shift its phase from $\phi_0$ twenty steps to the left. This takes receiver 670-2 out of eye 500, so that second receiver 670-2 experiences an unacceptable error rate. Second receiver 670-2 autonomously reverts to $\phi_0$ (or some other suitable default setting), and reports via SKP messaging and/or status registers that the margining operation failed, and it thus bailed out to ensure that the interconnect would continue operating properly.

Figure 9:
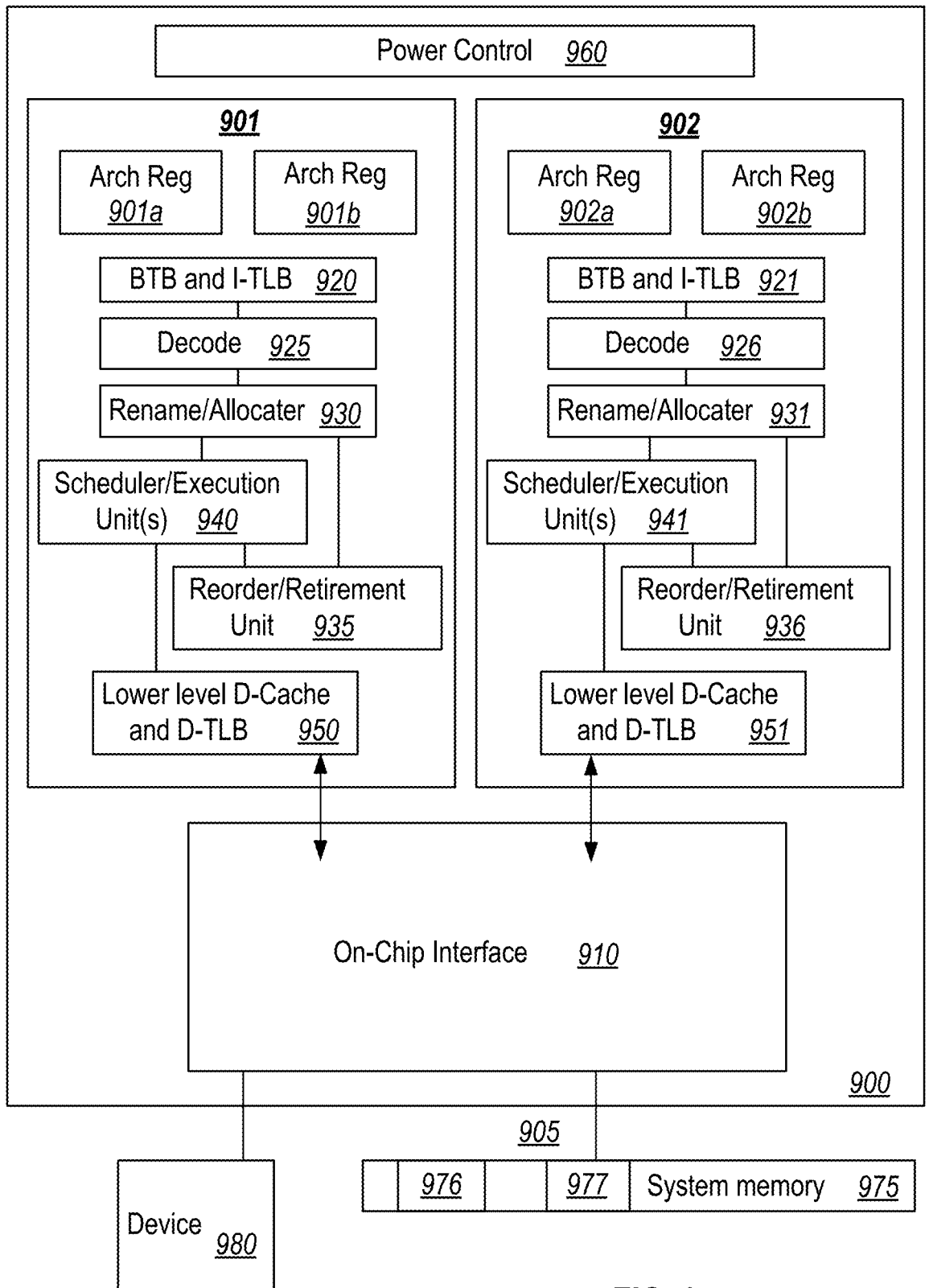
FIG. 9 illustrates an embodiment of a block diagram for a computing system including a multicore processor.

Referring to FIG. 9, an embodiment of a block diagram for a computing system including a multicore processor is depicted. Processor 900 includes any processor or processing device, such as a microprocessor, an embedded processor, a digital signal processor (DSP), a network processor, a handheld processor, an application processor, a co-processor, a system on a chip (SOC), or other device to execute code. Processor 900, in one embodiment, includes at least two cores—core 901 and 902, which may include asymmetric cores or symmetric cores (the illustrated embodiment). However, processor 900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 900, as illustrated in FIG. 9, includes two cores—core 901 and 902. Here, core 901 and 902 are considered symmetric cores, i.e. cores with the same configurations, functional units, and/or logic. In another embodiment, core 901 includes an out-of-order processor core, while core 902 includes an in-order processor core. However, cores 901 and 902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 901 are described in further detail below, as the units in core 902 operate in a similar manner in the depicted embodiment.

As depicted, core 901 includes two hardware threads 901a and 901b, which may also be referred to as hardware thread slots 901a and 901b. Therefore, software entities, such as an operating system, in one embodiment potentially view processor 900 as four separate processors, i.e., four logical processors or processing elements capable of executing four software threads concurrently. As alluded to above, a first thread is associated with architecture state registers 901a, a second thread is associated with architecture state registers 901b, a third thread may be associated with architecture state registers 902a, and a fourth thread may be associated with architecture state registers 902b. Here, each of the architecture state registers (901a, 901b, 902a, and 902b) may be referred to as processing elements, thread slots, or thread units, as described above. As illustrated, architecture state registers 901a are replicated in architecture state registers 901b, so individual architecture states/contexts are capable of being stored for logical processor 901a and logical processor 901b. In core 901, other smaller resources, such as instruction pointers and renaming logic in allocator and renamer block 930 may also be replicated for threads 901a and 901b. Some resources, such as re-order buffers in reorder/retirement unit 935, ILTB 920, load/store buffers, and queues may be shared through partitioning. Other resources, such as general purpose internal registers, page-table base register(s), low-level data-cache and data-TLB 915, execution unit(s) 940, and portions of out-of-order unit 935 are potentially fully shared.

Processor 900 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 901 includes a simplified, representative out-of-order (OOO) processor core. But an in-order processor may be utilized in different embodiments. The OOO core includes a branch target buffer 920 to predict branches to be executed/taken and an instruction-translation buffer (I-TLB) 920 to store address translation entries for instructions.

Core 901 further includes decode module 925 coupled to fetch unit 920 to decode fetched elements. Fetch logic, in one embodiment, includes individual sequencers associated with thread slots 901a, 901b, respectively. Usually core 901 is associated with a first ISA, which defines/specifies instructions executable on processor 900. Often machine code instructions that are part of the first ISA include a portion of the instruction (referred to as an opcode), which references/specifies an instruction or operation to be performed. Decode logic 925 includes circuitry that recognizes these instructions from their opcodes and passes the decoded instructions on in the pipeline for processing as defined by the first ISA. For example, as discussed in more detail below decoders 925, in one embodiment, include logic designed or adapted to recognize specific instructions, such as transactional instruction. As a result of the recognition by decoders 925, the architecture or core 901 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 926, in one embodiment, recognize the same ISA (or a subset thereof). Alternatively, in a heterogeneous core environment, decoders 926 recognize a second ISA (either a subset of the first ISA or a distinct ISA).

In one example, allocator and renamer block 930 includes an allocator to reserve resources, such as register files to store instruction processing results. However, threads 901a and 901b are potentially capable of out-of-order execution, where allocator and renamer block 930 also reserves other resources, such as reorder buffers to track instruction results. Unit 930 may also include a register renamer to rename program/instruction reference registers to other registers internal to processor 900. Reorder/retirement unit 935 includes components, such as the reorder buffers mentioned above, load buffers, and store buffers, to support out-of-order execution and later in-order retirement of instructions executed out-of-order.

Scheduler and execution unit(s) block 940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to execution unit(s) 940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 901 and 902 share access to higher-level or further-out cache, such as a second level cache associated with on-chip interface 910. Note that higher-level or further-out refers to cache levels increasing or getting further way from the execution unit(s). In one embodiment, higher-level cache is a last-level data cache—last cache in the memory hierarchy on processor 900—such as a second or third level data cache. However, higher level cache is not so limited, as it may be associated with or include an instruction cache. A trace cache—a type of instruction cache—instead may be coupled after decoder 925 to store recently decoded traces. Here, an instruction potentially refers to a macro-instruction (i.e. a general instruction recognized by the decoders), which may decode into a number of micro-instructions (micro-operations).

In the depicted configuration, processor 900 also includes on-chip interface module 910. Historically, a memory controller, which is described in more detail below, has been included in a computing system external to processor 900. In this scenario, on-chip interface 910 is to communicate with devices external to processor 900, such as system memory 975, a chipset (often including a memory controller hub to connect to memory 975 and an I/O controller hub to connect peripheral devices), a memory controller hub, a northbridge, or other integrated circuit. And in this scenario, bus 905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 975 may be dedicated to processor 900 or shared with other devices in a system. Common examples of types of memory 975 include DRAM, SRAM, non-volatile memory (NV memory), and other known storage devices. Note that device 980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 900. For example in one embodiment, a memory controller hub is on the same package and/or die with processor 900. Here, a portion of the core (an on-core portion) 910 includes one or more controller(s) for interfacing with other devices such as memory 975 or a graphics device 980. The configuration including an interconnect and controllers for interfacing with such devices is often referred to as an on-core (or un-core configuration). As an example, on-chip interface 910 includes a ring interconnect for on-chip communication and a high-speed serial point-to-point link 905 for off-chip communication. Yet, in the SOC environment, even more devices, such as the network interface, co-processors, memory 975, graphics processor 980, and any other known computer devices/interface may be integrated on a single die or integrated circuit to provide small form factor with high functionality and low power consumption.

In one embodiment, processor 900 is capable of executing a compiler, optimization, and/or translator code 977 to compile, translate, and/or optimize application code 976 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 10:
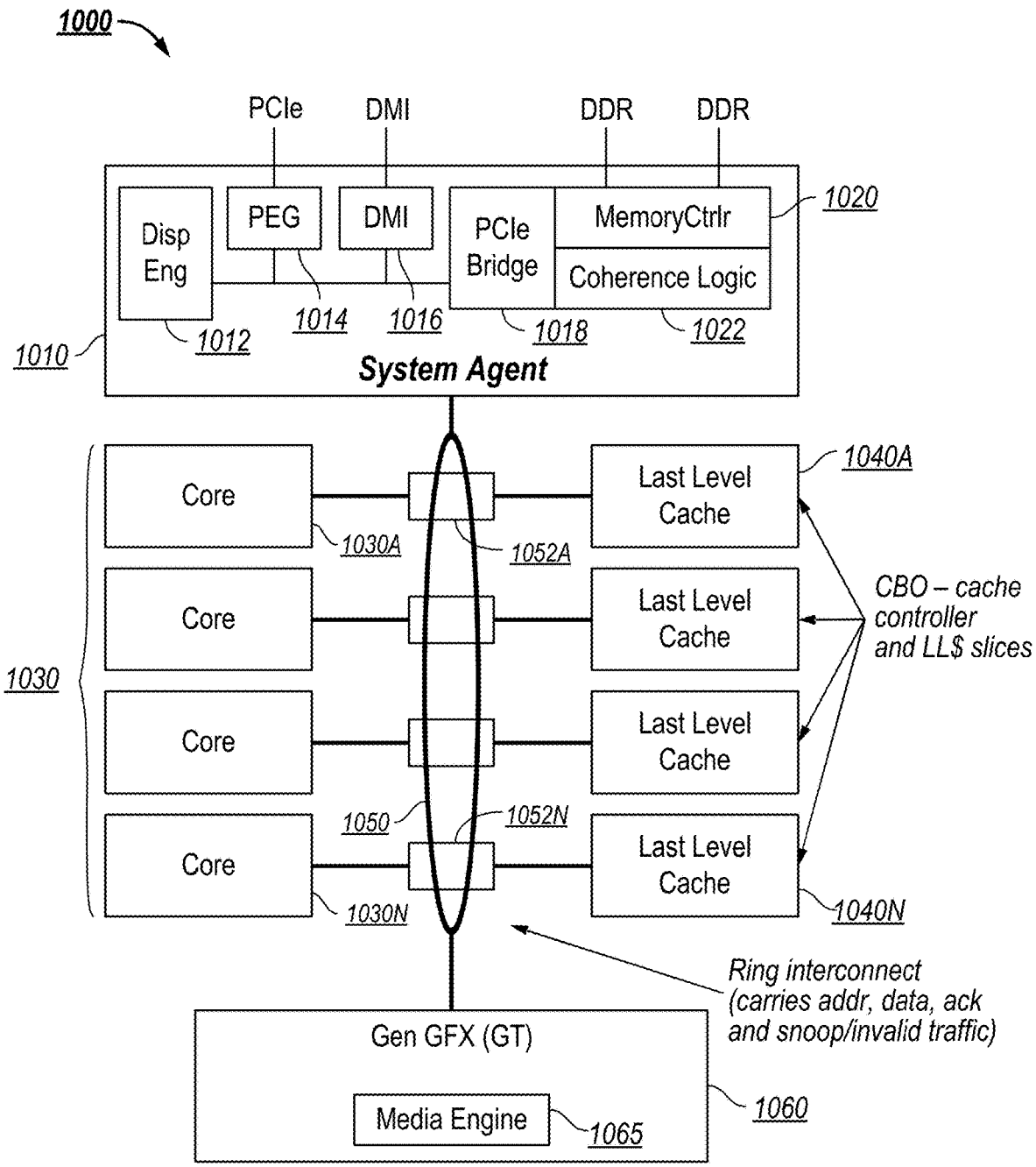
FIG. 10 illustrates another embodiment of a block diagram for a computing system including a multicore processor.

Referring now to FIG. 10, shown is a block diagram of an embodiment of a multicore processor. As shown in the embodiment of FIG. 10, processor 1000 includes multiple domains. Specifically, a core domain 1030 includes a plurality of cores 1030A-1030N, a graphics domain 1060 includes one or more graphics engines having a media engine 1065, and a system agent domain 1010.

In various embodiments, system agent domain 1010 handles power control events and power management, such that individual units of domains 1030 and 1060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1030 and 1060 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1030 further includes low level caches in addition to various execution units and additional processing elements. Here, the various cores are coupled to each other and to a shared cache memory that is formed of a plurality of units or slices of a last level cache (LLC) 1040A-1040N; these LLCs often include storage and cache controller functionality and are shared amongst the cores, as well as potentially among the graphics engine too.

As seen, a ring interconnect 1050 couples the cores together, and provides interconnection between the core domain 1030, graphics domain 1060 and system agent circuitry 1010, via a plurality of ring stops 1052A-1052N, each at a coupling between a core and LLC slice. As seen in FIG. 10, interconnect 1050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1010 includes display engine 1012 which is to provide control of and an interface to an associated display. System agent domain 1010 may include other units, such as: an integrated memory controller 1020 that provides for an interface to a system memory (e.g., a DRAM implemented with multiple DIMMs; coherence logic 1022 to perform memory coherence operations. Multiple interfaces may be present to enable interconnection between the processor and other circuitry. For example, in one embodiment at least one direct media interface (DMI) 1016 interface is provided as well as one or more PCIe™ interfaces 1014. The display engine and these interfaces typically couple to memory via a PCIe™ bridge 1018. Still further, to provide for communications between other agents, such as additional processors or other circuitry, one or more other interfaces may be provided.

Figure 11:
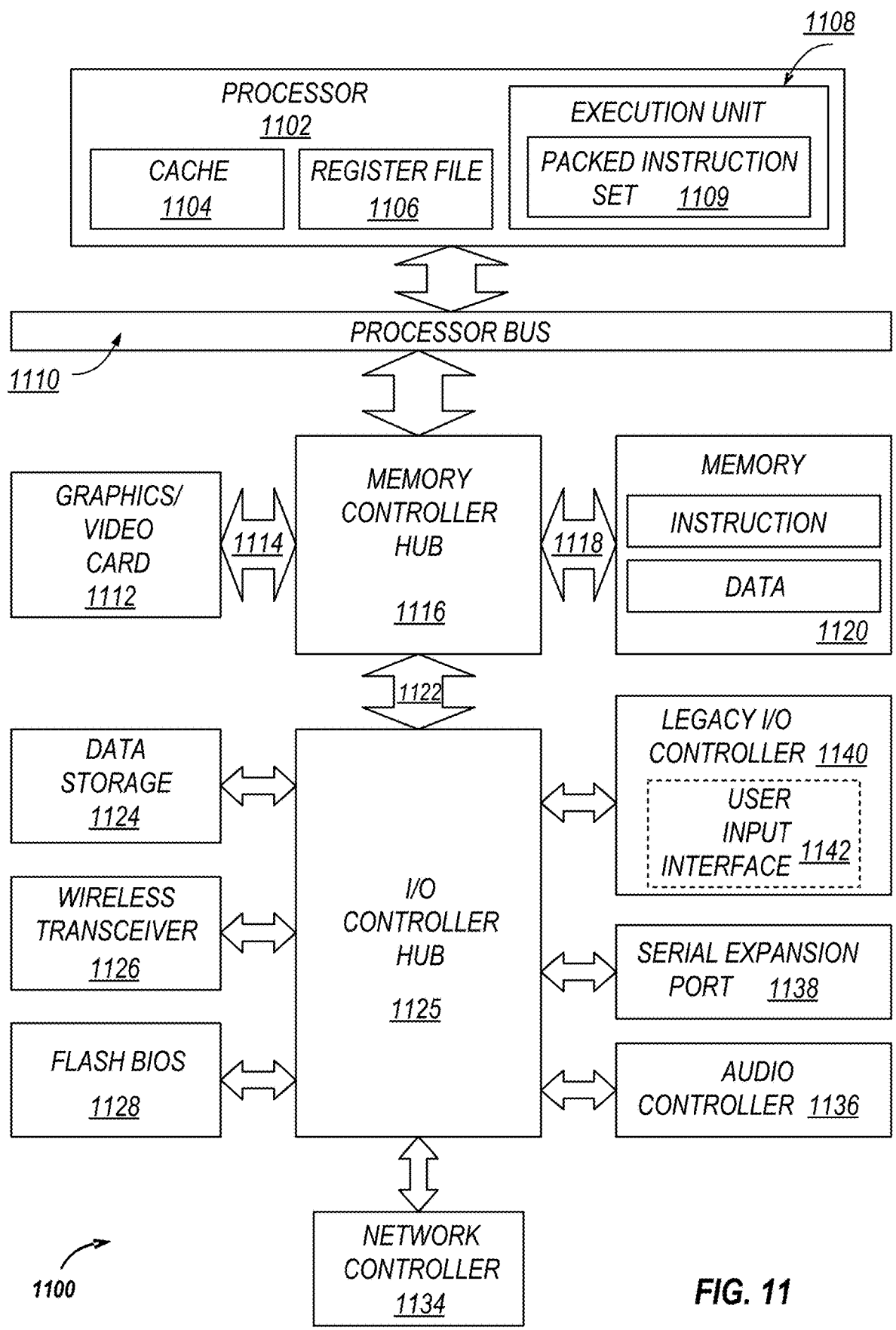
FIG. 11 illustrates another embodiment of a block diagram for a computing system including a processor.

Turning to FIG. 11, a block diagram of an exemplary computer system formed with a processor that includes execution units to execute an instruction, where one or more of the interconnects implement one or more features in accordance with one embodiment of the present invention is illustrated. System 1100 includes a component, such as a processor 1102 to employ execution units including logic to perform algorithms for process data, in accordance with the present invention, such as in the embodiment described herein. System 1100 is representative of processing systems based on the PENTIUM III™, PENTIUM 4™, Xeon™ Itanium, XScale™ and/or StrongARM™ microprocessors, although other systems (including PCs having other microprocessors, engineering workstations, set-top boxes and the like) may also be used. In one embodiment, sample system 1100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1102 includes one or more execution units 1108 to implement an algorithm that is to perform at least one instruction. One embodiment may be described in the context of a single processor desktop or server system, but alternative embodiments may be included in a multiprocessor system. System 1100 is an example of a 'hub' system architecture. The computer system 1100 includes a processor 1102 to process data signals. The processor 1102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1102 is coupled to a processor bus 1110 that transmits data signals between the processor 1102 and other components in the system 1100. The elements of system 1100 (e.g. graphics accelerator 1112, memory controller hub 1116, memory 1120, I/O controller hub 1125, wireless transceiver 1126, Flash BIOS 1128, Network controller 1134, Audio controller 1136, Serial expansion port 1138, I/O controller 1140, etc.) perform their conventional functions that are well known to those familiar with the art.

In one embodiment, the processor 1102 includes a Level 1 (L1) internal cache memory 1104. Depending on the architecture, the processor 1102 may have a single internal cache or multiple levels of internal caches. Other embodiments include a combination of both internal and external caches depending on the particular implementation and needs. Register file 1106 is to store different types of data in various registers including integer registers, floating point registers, vector registers, banked registers, shadow registers, checkpoint registers, status registers, and instruction pointer register.

Execution unit 1108, including logic to perform integer and floating point operations, also resides in the processor 1102. The processor 1102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1102. For one embodiment, execution unit 1108 includes logic to handle a packed instruction set 1109. By including the packed instruction set 1109 in the instruction set of a general-purpose processor 1102, along with associated circuitry to execute the instructions, the operations used by many multimedia applications may be performed using packed data in a general-purpose processor 1102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1108 may also be used in micro controllers, embedded processors, graphics devices, DSPs, and other types of logic circuits. System 1100 includes a memory 1120. Memory 1120 includes a dynamic random access memory (DRAM) device, a static random access memory (SRAM) device, flash memory device, or other memory device. Memory 1120 stores instructions and/or data represented by data signals that are to be executed by the processor 1102.

Note that any of the aforementioned features or aspects of the invention may be utilized on one or more interconnect illustrated in FIG. 11. For example, an on-die interconnect (ODI), which is not shown, for coupling internal units of processor 1102 implements one or more aspects of the invention described above. Or the invention is associated with a processor bus 1110 (e.g. other known high performance computing interconnect), a high bandwidth memory path 1118 to memory 1120, a point-to-point link to graphics accelerator 1112 (e.g. a Peripheral Component Interconnect express (PCIe) compliant fabric), a controller hub interconnect 1122, an I/O or other interconnect (e.g. USB, PCI, PCIe) for coupling the other illustrated components. Some examples of such components include the audio controller 1136, firmware hub (flash BIOS) 1128, wireless transceiver 1126, data storage 1124, legacy I/O controller 1110 containing user input and keyboard interfaces 1142, a serial expansion port 1138 such as Universal Serial Bus (USB), and a network controller 1134. The data storage device 1124 can comprise a hard disk drive, a floppy disk drive, a CD-ROM device, a flash memory device, or other mass storage device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

The following examples pertain to embodiments in accordance with this Specification. One or more embodiments may provide an apparatus, a system, a machine readable storage, a machine readable medium, hardware- and/or software-based logic, and a method to provide in-band margin testing.

There is disclosed in an example 1, a root circuit of an interconnect, comprising: a data interface to communicatively couple the root circuit to a downstream circuit; and a margin tester to send a margin test directive to the downstream member via the data interface during a normal operating state of the interconnect.

In example 2, the root circuit of example 1 can optionally include that the margin tester is to encode the margin test directive in one or more filler bits.

In example 3, the root circuit of example 1 may optionally include that the margin tester is to provide the margin test directive in-band.

In example 4, the root circuit of example 1 may optionally include that the interconnect is a PCI Express interconnect.

In example 5, the root circuit of example 4 may optionally include that the normal operating state of the interconnect is an L0 state.

In example 6, the root circuit of example 5 may optionally include a locker to lock out modes other than L0 during a margin operation.

In example 7, the root circuit of any of examples 1, 2, 3, 4, 5, or 6, may optionally include that the margin tester is to perform self margining.

There is disclosed in example 8, a downstream circuit of an interconnect, comprising: a data interface to communicatively couple the downstream circuit to a root circuit; and a margin tester to, during a normal operating state of the interconnect, receive a margin test directive via the data interface, perform a margin test, and provide a result report of the margin test via the data interface.

In example 9, the downstream circuit of example 8 may optionally include that the margin tester is to encode the result report in one or more filler bits.

In an example 10, the downstream circuit of example 8 may optionally include that the margin tester is to provide the result report in-band.

In example 11, the downstream circuit of example 8 may optionally include that the interconnect is a PCI Express interconnect.

In example 12, the downstream circuit of example 11 may optionally include that the normal operating state of the interconnect is an L0 state.

In example 13, the downstream circuit of any of examples 8, 9, 10, 11, or 12, may optionally include that the margin tester is to detect an error rate above a threshold and to move to a default margin.

In example 14, the downstream circuit of any of examples 8, 9, 10, 11, or 12, may optionally an error log and logic to clear the error log to restart a margin operation.

In example 15, the downstream circuit of any of examples 8, 9, 10, 11, or 12, performing the margin test may optionally include adjusting a time or voltage margin of the interconnect.

There is disclosed in example 16, a computing system comprising: one or more processing cores; a memory communicatively coupled to the one or more processor cores via a memory bus; and an interconnect communicatively coupled to the one or more processing cores to provide an expansion bus, the interconnect comprising: a data link comprising a plurality of lanes; and a root circuit communicatively coupled to the data link, the root circuit comprising logic to provide a margin test directive to a downstream device via the data link during a normal operating state, and receive a result report from the downstream device during the normal operating state.

In example 17, in the system of example 16 the margin test directive may optionally compute a margin window on a link segment of one of the plurality of lanes, wherein the margin window comprises an operational two-dimensional window of the link segment comprising time and voltage axes, wherein no or acceptably few errors are experienced.

In example 18, the system of example 16, may optionally include that test directive is to adjust a time or voltage setting by one or more discrete increments and to observe a resulting error rate.

In example 19, the system of any of examples 16, 17, or 18, may optionally include that the circuit is further operable to perform self-margining comprising performing a margin test itself and observing results.

In example 20, the system of any of examples 16, 17, or 18, may optionally include that the root circuit further comprises an encoder to encode the test directive in one or more filler bits to be provided on the data link.

In example 21, the system of any of examples any of examples 16, 17, or 18, may optionally include that the logic of the root circuit is further to receive the result report in one or more filler bits to be provided on the data link.

In example 22, the system of any of examples any of examples 16, 17, or 18, may optionally include that the logic of the root circuit is to provide the margin test directive in-band.

In example 23, the system of any of examples 16, 17, or 18 may optionally include that the logic of the root circuit is to receive the result report in-band.

In example 24, a system-on-a-chip may optionally comprise the system of any of examples 16, 17, 18, 19, 20, 21, 22, or 23.

In example 25, a method for testing margin in an interconnect, comprising: sending a margin test directive from a root circuit to a downstream circuit during a normal operating state of the interconnect; and receiving a margin test result report from the downstream member during normal operation.

In example 26, the method of example 25 may optionally include performing self-margining comprising on the root circuit comprising the root circuit adjusting its own margin and observing a result.

In example 27, the method of example 25 may optionally include encoding the test directive in one or more filler bits, wherein the filler bits are to provide synchronization between the first device and second device.

In example 28, the method of any of examples 25, 26, or 27, may optionally include encoding the test directive in-band.

In example 29, the method of any of examples 25, 26, or 27 may optionally include receiving the margin test result in-band.

In example 30, the method of any of examples 25, 26, or 27 may optionally include a directive to clear an error log.

In example 31, the method of any of examples 25, 26, 27, 28, 29, or 30 may optionally include sending the margin test directive comprising sending a directive to adjust a time or voltage margin of the interconnect.

In example 32, the method of any of examples 25, 26, 27, 28, 29, or 30 may optionally include computing a margin window on a link segment of the interconnect, wherein the margin window comprises an operational window of the link segment wherein no or acceptably few errors are experienced.

In example 33, there is disclosed an apparatus comprising means for performing the method of any of examples 25, 26, 27, 28, 29, 30, 31, or 32.

In example 34, there is disclosed the apparatus of example 33, wherein the means for performing the method may optionally include a processor and a memory.

In example 35, the apparatus of example 34 may optionally include that the memory comprises machine-readable instructions, that when executed cause the apparatus to perform the method of any of examples 25, 26, 27, 28, 29, 30, 31, or 32.

In example 36, the apparatus of any of examples 33, 34, or 35, may optionally include that the apparatus is a computing system.

In example 37, at least one computer readable medium may optionally include instructions that, when executed, implement a method or realize an apparatus as claimed in any of examples 25, 26, 27, 28, 29, 30, 31, 32, 33, 34, 35, or 36.

In example 38, a method may optionally include performing the operations disclosed in any of the preceding examples.

In example 39, an apparatus may optionally include means for performing the method of example 38.

In example 40, the apparatus of example 39, the means may optionally comprise a processor and a memory.

In example 41, one or more tangible, non-transitory computer-readable storage mediums may optionally have stored thereon executable instructions for providing the method or realizing the apparatus of any of the preceding examples.

The invention claimed is:

1. An apparatus comprising:
an interface to couple to a device over an interconnect, wherein the interconnect comprises a plurality of physical lanes, and the interface comprises protocol circuitry to:
establish a link on the interconnect based on an interconnect protocol;
enter an active link state on the link, wherein the active link state is defined in the interconnect protocol;
send a first ordered set to the device over the link while in the active link state, wherein the first ordered set indicates a margin command to the device, wherein the margin command is associated with receiver lane margining at the device; and
receive, responsive to the first ordered set, a second ordered set from the device over the link while the link remains in the active link state, wherein the second ordered set indicates lane margining information for the device based on the margin command.

2. The apparatus of claim 1, wherein the interconnect protocol comprises a Peripheral Component Interconnect Express (PCIe)-based protocol.

3. The apparatus of claim 2, wherein the first ordered set comprises a first PCIe SKP ordered set (OS) and the second ordered set comprises a second PCIe SKP OS.

4. The apparatus of claim 3, wherein a symbol of the first PCIe SKP OS comprises a value to identify a particular margin command in a set of margin commands for performing receiver lane margining.

5. The apparatus of claim 4, wherein the particular margin command comprises a timing offset to be applied at a receiver of the device.

6. The apparatus of claim 4, wherein the particular margin command comprises a voltage offset to be applied at a receiver of the device.

7. The apparatus of claim 3, wherein a symbol of the second PCIe SKP OS comprises a report to identify status of a receiver of the device based on the receiver lane margining.

8. The apparatus of claim 7, wherein the status of the receiver comprises an indication of errors resulting from performance of the margin command during the receiver lane margining.

9. The apparatus of claim 1, wherein the receiver lane margining comprises adjusting an eye at a receiver lane of the device.

10. The apparatus of claim 1, further comprising a control register, wherein the margin command is written to the control register by software, and the first ordered set comprises values based on values written to the control register.

11. The apparatus of claim 1, further comprising a status register, wherein data is written to the status register based on contents of the second ordered set.

12. The apparatus of claim 1, wherein the device comprises a retimer, the link is to couple the interface to an endpoint device, the retimer is positioned between the interface and the endpoint device on the link, and the first ordered set identifies the retimer as a target of the margin command.

13. An apparatus comprising:
a port to couple to a device via a link, wherein the link comprises a plurality of lanes, and the port comprises:
receiver circuitry to receive data from the device over the link;
protocol circuitry to:
enter an active link state for the link; and
identify a first SKP ordered set (OS) received from the device over the link while the link is in the active link state, wherein the first SKP OS comprises a field to identify a margin command associated with margining of the receiver circuitry; and
margining circuitry to:
perform the margin command; and
determine margining status of the receiver circuitry associated with the margin command;
wherein the protocol circuitry is to send a second SKP OS responsive to the first SKP OS, and the second SKP OS comprises a field to report the margining status.

14. The apparatus of claim 13, wherein the link is compliant with a Peripheral Component Interconnect Express (PCIe)-based protocol, and the first SKP OS and the second SKP OS are according to the PCIe-based protocol.

15. The apparatus of claim 13, wherein the link operates at a rate of at least 16 GT/s.

16. The apparatus of claim 13, further comprising retimer circuitry to extend a physical length of a link, wherein the link is to couple the device with an endpoint device, and the apparatus is to be positioned between the device and the endpoint device on the link.

17. The apparatus of claim 13, wherein the first SKP OS comprises a first field to identify the margin command, and a second field to identify that the margin command is intended for the apparatus.

18. At least one non-transitory machine-readable storage medium with instructions stored thereon, the instructions executable by a machine to cause the machine to:
write command data to a margining lane control register associated with a receiver of a first device, wherein the first device is coupled to a second device on a link, and the command data causes the second device to send a first ordered set to the first device over the link while the link is in an active link state, and the first ordered set identifies a margin command associated with the command data;
identify report data written to a margining lane status register by the second device based on a second ordered set sent from the first device to the second device on the link while the link remains in the active link state, wherein the second ordered set reports results of performance of the margin command by the first device; and determine a next margin command to be performed to margin lanes of the receiver of the first device based on the report data.

19. The storage medium of claim 18, wherein the instructions are further executable to cause the machine to:
write second command data to the margining lane control register to indicate the next margin command, wherein the second command data causes the second device to send a third ordered set to the first device over the link while the link remains in the active link state, and the third ordered set identifies the next margin command; and
identify second report data written to the margining lane status register by the second device based on a fourth ordered set sent from the first device to the second device on the link while the link remains in the active link state, wherein the fourth ordered set reports results of performance of the next margin command by the first device.

20. The storage medium of claim 18, wherein the link is compliant with a PCIe-based interconnect protocol.

21. The storage medium of claim 20, wherein the active link state comprises a PCIe L0 state.

22. The storage medium of claim 20, wherein the first ordered set comprises a first PCIe SKP ordered set, and the second ordered set comprises a second PCIe SKP ordered set.

23. A system comprising:
a first device;
a second device coupled to the first device by an interconnect, the interconnect comprises a plurality of physical lanes, and the second device comprises:
a processor;
system software executable by the processor;
a set of registers; and
protocol logic to:
establish a link according to a protocol on the interconnect;
identify a margin command in the set of registers;
send a first ordered set to the first device over the link while the link is in an active link state, wherein the first ordered set indicates the margin command to the device, and the margin command is associated with receiver lane margining at the first device;
receive a second ordered set from the first device while the link remains in the active link state, wherein the second ordered set indicates receiver lane margining information for the first device based on the margin command; and
write the receiver lane margining information to the set of registers for use by the system software.

24. The system of claim 23, wherein the first device comprises margining circuitry to perform the margin command at a receiver of the first device.

25. The system of claim 23, further comprising a retimer device positioned between the first device and second device on the link, wherein the first ordered set comprises a field to identify whether the margin command is intended for the first device or the retimer device.

26. The system of claim 23, wherein the protocol comprises a PCIe-based protocol.

27. The system of claim 26, wherein the first ordered set comprises a first PCIe SKP ordered set, and the second ordered set comprises a second PCIe SKP ordered set.

28. The system of claim 26, wherein the second device comprises a host and the first device comprises a PCIe endpoint device.

* * * * *